US010408664B2

(12) United States Patent
Sato et al.

(10) Patent No.: US 10,408,664 B2
(45) Date of Patent: Sep. 10, 2019

(54) FLOAT LIQUID LEVEL METER INDICATOR

(71) Applicant: NIHON KLINGAGE CO., LTD., Tokyo (JP)

(72) Inventors: Maki Sato, Soka (JP); Tadao Miyano, Soka (JP); Tatsuo Sato, Soka (JP)

(73) Assignee: NIHON KLINGAGE CO., LTD., Tokyo (JP)

( * ) Notice: Subject to any disclaimer, the term of this patent is extended or adjusted under 35 U.S.C. 154(b) by 99 days.

(21) Appl. No.: 15/570,173

(22) PCT Filed: Sep. 5, 2016

(86) PCT No.: PCT/JP2016/076013
§ 371 (c)(1),
(2) Date: Oct. 27, 2017

(87) PCT Pub. No.: WO2017/056864
PCT Pub. Date: Apr. 6, 2017

(65) Prior Publication Data
US 2018/0120143 A1 May 3, 2018

(30) Foreign Application Priority Data
Oct. 2, 2015 (JP) ................................ 2015-196949

(51) Int. Cl.
G01F 23/62 (2006.01)
G01F 23/76 (2006.01)
G01F 23/74 (2006.01)

(52) U.S. Cl.
CPC ............ G01F 23/62 (2013.01); G01F 23/74 (2013.01); G01F 23/76 (2013.01)

(58) Field of Classification Search
CPC .......... G01F 23/66; G01F 23/72; G01F 23/74; G01F 23/02; G01F 23/38
See application file for complete search history.

(56) References Cited

U.S. PATENT DOCUMENTS 2,920,484 A * 1/1960 Reichert ................. G01F 23/66
324/67
2,934,953 A * 5/1960 Anderson ............... G01F 23/66
73/319

(Continued)

FOREIGN PATENT DOCUMENTS

JP H03-13530 B2 2/1991
JP 2818753 B2 10/1998

OTHER PUBLICATIONS

International Search Report issued in PCT/JP2016/076013; dated Oct. 11, 2016.

(Continued)

Primary Examiner — David A Rogers
(74) Attorney, Agent, or Firm — Studebaker & Brackett PC

(57) ABSTRACT

The float liquid level meter indicator includes rotatable slats; a supporting metal fixture not obstructing rotation of the rotatable slats, the supporting metal fixture having an opening for observing a state of the rotatable slats and rotation shaft supporting hole pairs for supporting the rotation shafts provided on left and right of the rotatable slats, the hole pairs being disposed at equal intervals in an up-down direction, at least one side of the rotation shaft supporting hole pairs being of a cutout shape or an elongated hole shape in a front-rear direction; a housing for attaching to the float-liquid level meter, having a groove which prevents the rotatable slats inserted in the up-down direction and the supporting metal fixture from falling off in a front-rear direction, and having an opening for observing the state of the rotatable slats; and a lid for avoiding the supporting metal fixture from falling out from the housing.

4 Claims, 12 Drawing Sheets

(56) References Cited

U.S. PATENT DOCUMENTS

| | | | | | |
|---|---|---|---|---|---|
| 3,420,103 | A | * | 1/1969 | Peschek | G01F 23/66 73/319 |
| 3,964,312 | A | * | 6/1976 | Sebek | G01F 23/66 73/314 |
| 4,194,397 | A | * | 3/1980 | Yasuda | G01F 23/66 73/314 |
| 4,457,171 | A | * | 7/1984 | Gebauer | G01F 23/72 73/305 |
| 4,512,190 | A | * | 4/1985 | Sledmere | G01F 23/72 335/302 |
| 4,922,764 | A | * | 5/1990 | Welker | B01F 13/0016 73/863 |
| 5,497,725 | A | * | 3/1996 | Theisen | F16K 37/0016 116/204 |
| 5,988,701 | A | * | 11/1999 | Wu | G01F 23/74 285/197 |
| 6,435,026 | B1 | * | 8/2002 | Donehue | G01F 23/74 73/314 |
| 8,933,810 | B1 | * | 1/2015 | Donehue | G01F 23/0046 340/618 |
| 9,134,162 | B2 | * | 9/2015 | Taylor | G01F 23/02 |
| 9,638,565 | B2 | * | 5/2017 | Carlson | G01F 23/72 |
| 9,709,434 | B1 | * | 7/2017 | Harper | G01F 23/66 |
| 2012/0324996 | A1 | * | 12/2012 | Taylor | G01F 23/72 73/313 |

OTHER PUBLICATIONS

Written Opinion issued in PCT/JP2016/076013; dated Oct. 11, 2016.

* cited by examiner

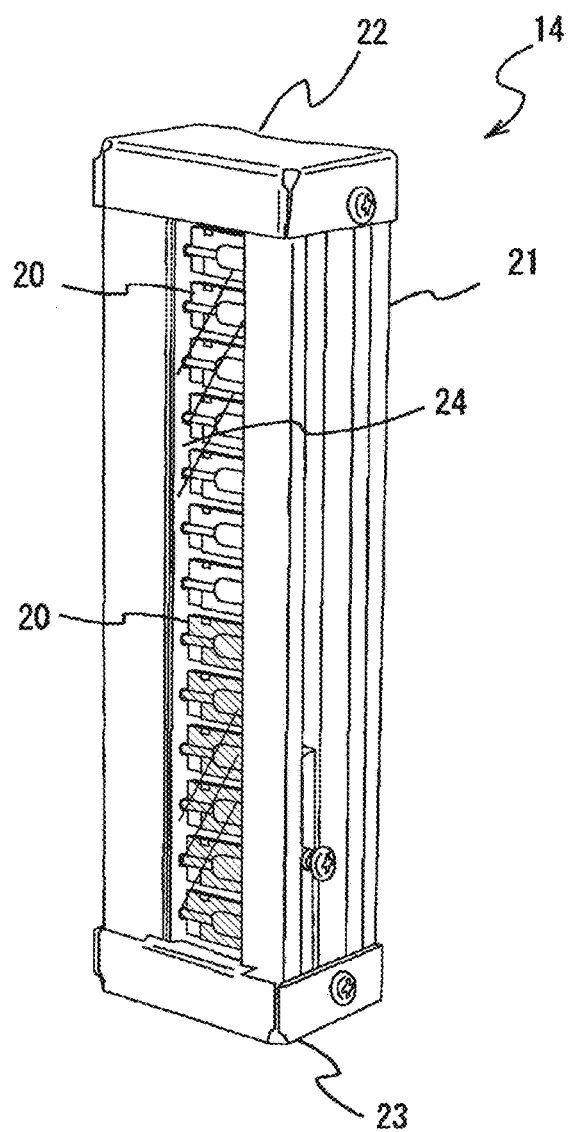
FIG. 2A
PRIOR ART
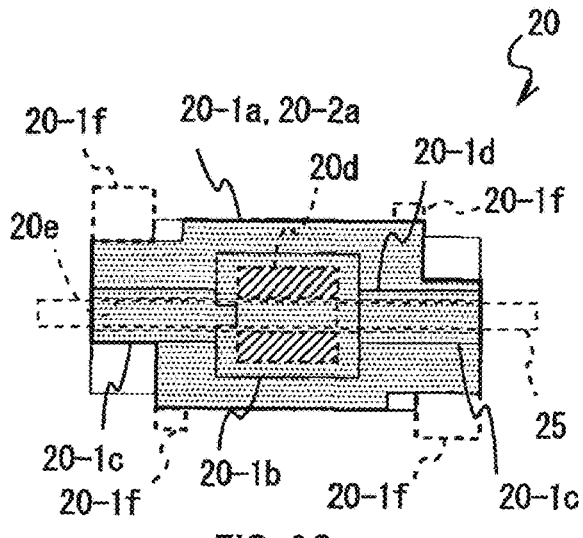
FIG. 2B
PRIOR ART
FIG. 2C
PRIOR ART

FLOAT LIQUID LEVEL METER INDICATOR

TECHNICAL FIELD

The present invention relates to a float liquid level meter indicator.

BACKGROUND ART

One type of a measuring instrument for detecting a liquid level in boilers and water storage tanks is a float liquid level meter.

One example of this float liquid level meter is a magnet-installed float liquid level meter, capable of securely detecting at all times a surface of a liquid inside a container to be detected, by using a magnet-installed float of a small size and of light weight (for example, see Patent Document 1).

The invention described in Patent Document 1 relates to a magnet float liquid level meter. More specifically, the invention described in Patent Document 1 has a tubular body provided in a protruding manner from an inner surface of a standing column opposing an opening of a lower connecting pipe among upper and lower connecting pipes that connect a liquid container of which a liquid level is to be detected and the standing column, which tubular body configures a magnetic powder reservoir, and by disposing a magnet detachably with a screw within the tubular body, the magnetic powder inside the liquid is attracted to the magnet and is grown inside the magnetic powder reservoir, and any liquid flow obstruction caused by growth in magnetic powder easily generated within the connecting pipes and on the inner surface of the standing columns is eliminated, thus simplifying cleaning of grown magnetic powder.

FIG. 1 is a schematic view of a float liquid level meter 10. A standing column 11 serving as a tubular member is connected via connecting pipes 12 and 13, to a boiler not shown that serves as a liquid container. Inside the standing column 11 disposed vertically in a longitudinal direction, a float incorporating a permanent magnet is inserted in a movable manner. The float is integrated with the permanent magnet whose magnetization direction is in a direction orthogonal to the longitudinal direction of the standing column 11.

On the outer surface of the standing column 11, a float liquid level indicator 14 is fixed along the longitudinal direction of the standing column 11, by using a fixing metal fixture 15. Moreover, a valve handle 16 is for discharging contents inside the standing column 11 when cleaning.

FIG. 2A is an appearance perspective view showing a conventional example of an indicator for the float liquid level meter shown in FIG. 1, FIG. 2B is a side view of a rotatable slat used in the indicator shown in FIG. 2A, and FIG. 2C is a front view of FIG. 2B.

In the indicator 14 shown in FIG. 2A, a plurality (in the drawing there are 13 pieces, however it is not limited to this) of rotatable slats 20 are disposed within a housing 21 in a longitudinal direction, being parallel to each other and in a rotatable manner.

The rotatable slats 20 shown in FIGS. 2B and 2C can have a rotation shaft 25 described later penetrate therethrough, and is a component adhering two pieces of members 20-1*a*, 20-2*a* capable of housing a tubular permanent magnet 20*d*. The member 20-1*a* is formed of semi-cylindrical portions 20-1*b*, 20-2*b*, and a claw portion 20-1*f* shown by broken lines on both ends of a surface of a part serving as wings formed by press-working. The member 20-2*a* also has a similar shape as the member 20-1*a*. The members 20-1*a* and 20-2*a* are colored in two colors, however at least one can be color free. The two pieces of members 20-1*a* and 20-2*a* are adhered together in a state of housing the permanent magnet 20*d* between the center semi-cylindrical portions 20-1*b* and 20-2*b*. The permanent magnet 20*d* is magnetized in a radial direction, and is disposed to have either side of the semi-cylindrical portions 20-1*b* and 20-2*b* (parts serving as wings) serve as the N-pole and S-pole, respectively. The rotatable slat 20 is formed by bending the claw portions 20-1*f* towards their respective counter sides.

FIG. 3 is an appearance perspective view showing a state taking off a lid 22 (23) of the indicator 14 shown in FIG. 2A, which lid 22 (23) is made of non-magnetic material, and having supporting metal fixtures 24, 24 pulled out from the housing 21 being made of non-magnetic material. FIG. 4 is an appearance perspective view showing a state in which the rotation shaft 25 is pulled out from the supporting metal fixtures 24, 24 shown in FIG. 3. FIG. 5 is an appearance perspective view showing a state in which the rotation shaft 25 is inserted into through holes 26, 26 of the pair of the supporting metal fixtures 24, 24 shown in FIG. 3.

The supporting metal fixtures 24, 24 are a pair of elongated members made of non-magnetic material, and are formed having the through holes 26 of the number of rotatable slats 20 facing each other at regular intervals.

The rotatable slat 20 is disposed between one pair of the supporting metal fixtures 24, 24, and the rotation shaft 25 is inserted through the through hole 26, the rotatable slat 20, and the through hole 26.

CITATION LIST

Patent Document

Patent Document 1: Patent No. 2818753 Publication

SUMMARY OF INVENTION

Problem to be Solved by the Invention

With the float indicator 14 described above, mounting work to insert the rotation shaft 25 in a state in which the rotatable slat 20 is disposed between the supporting metal fixtures 24, 24 is performed manually by hand. However, the inserting work of the rotation shaft 25 is troublesome, and attachment of the rotatable slat is cumbersome. For example, if the supporting metal fixtures 24, 24 incline while inserting the supporting metal fixtures 24, 24 into the housing 21 as a whole together with the rotatable slats 20, after inserting all the rotation shafts 25, the rotation shafts 25 may fall out from the through holes 26, or the rotatable slats 20 may fall off from the rotation shafts 25. Thus, every time this occurs, the rotation shafts 25 would need to be inserted into the supporting metal fixtures 24, 24 and the rotatable slats 20.

Moreover, in the magnet-float liquid level meter described in Patent Document 1 and the float indicator 14 described above, when the liquid level to be measured suddenly changes, there were cases in which the rotatable slats 20 rotate too much and the front and back sides of them become unaligned, thus making it impossible to read the position of the liquid level.

Furthermore, in the magnet-float liquid level meter described in Patent Document 1 and the float indicator 14 described above, no small displacements in liquid levels less than the intervals of the through holes 26 of the supporting metal fixture 24 could be recognized. Hence, there is room for development in improving measurement accuracy.

Accordingly, a main object of the present invention is to facilitate attachment of the rotatable slats to the supporting metal fixture, and a minor object is to enable measurement of a sudden change in liquid level, and another minor object is to improve measurement accuracy.

Means for Solving Problem

To solve the above-mentioned problem, according to the first aspect of the present invention, a float liquid level meter indicator includes a plurality of rotatable slats, each having a permanent magnet and rotation shafts to be rotatable in response to a float magnet position inside a float liquid level meter; a supporting metal fixture not obstructing rotation of the plurality of the rotatable slats, the supporting metal fixture having an opening enabling visual observation of a state of the rotatable slats and a plurality of rotation shaft supporting hole pairs adapted to support the rotation shafts provided on left and right of the rotatable slats at equal intervals in an up-down direction, at least one side of the rotation shaft supporting hole pairs being of a cutout shape or an elongated hole shape in a front-rear direction; a housing adapted to attach to the float-liquid level meter, having a groove which prevents the rotatable slats inserted in the up-down direction and the supporting metal fixture from falling off in a front-rear direction, and having an opening to enable visual observation of the state of the rotatable slats; and a lid adapted to avoid the supporting metal fixture from falling out from the housing.

Further to the above-mentioned structure, according to another aspect of the present invention, the rotatable slats are shaped asymmetrical with respect to the rotation shafts thereof, only one side of the rotatable slats is shaped contactable with part of the supporting metal fixture in rotational operation thereof, and a rotating range of the rotatable slats is limited by providing the rotation shaft supporting hole adapted to allow for a shape of the supporting metal fixture to contact only one side with respect to the rotation shaft of the rotatable slat at a certain angle of the rotatable slat.

Further to the above-mentioned structure, according to yet another aspect of the present invention, a plurality of the supporting metal fixtures are used, the plurality of the supporting metal fixtures being configured to be disposed vertically in series or in parallel, or in series and in parallel.

Effect of the Invention

According to the above aspects, the rotatable slats can be easily attached to the supporting metal fixture, sudden changes in liquid level can be measured, and measurement accuracy can be improved.

BRIEF DESCRIPTION OF DRAWINGS

FIG. 2A is an appearance perspective view showing a conventional example of an indicator used for the float liquid level meter shown in FIG. 1; FIG. 2B is a side view of the rotatable slat used in the indicator shown in FIG. 2A; and FIG. 2C is a front view of FIG. 2B.

DESCRIPTION OF EMBODIMENTS

<Appearance>

An embodiment of the present invention will be described with reference to the drawings.

Figure 6:
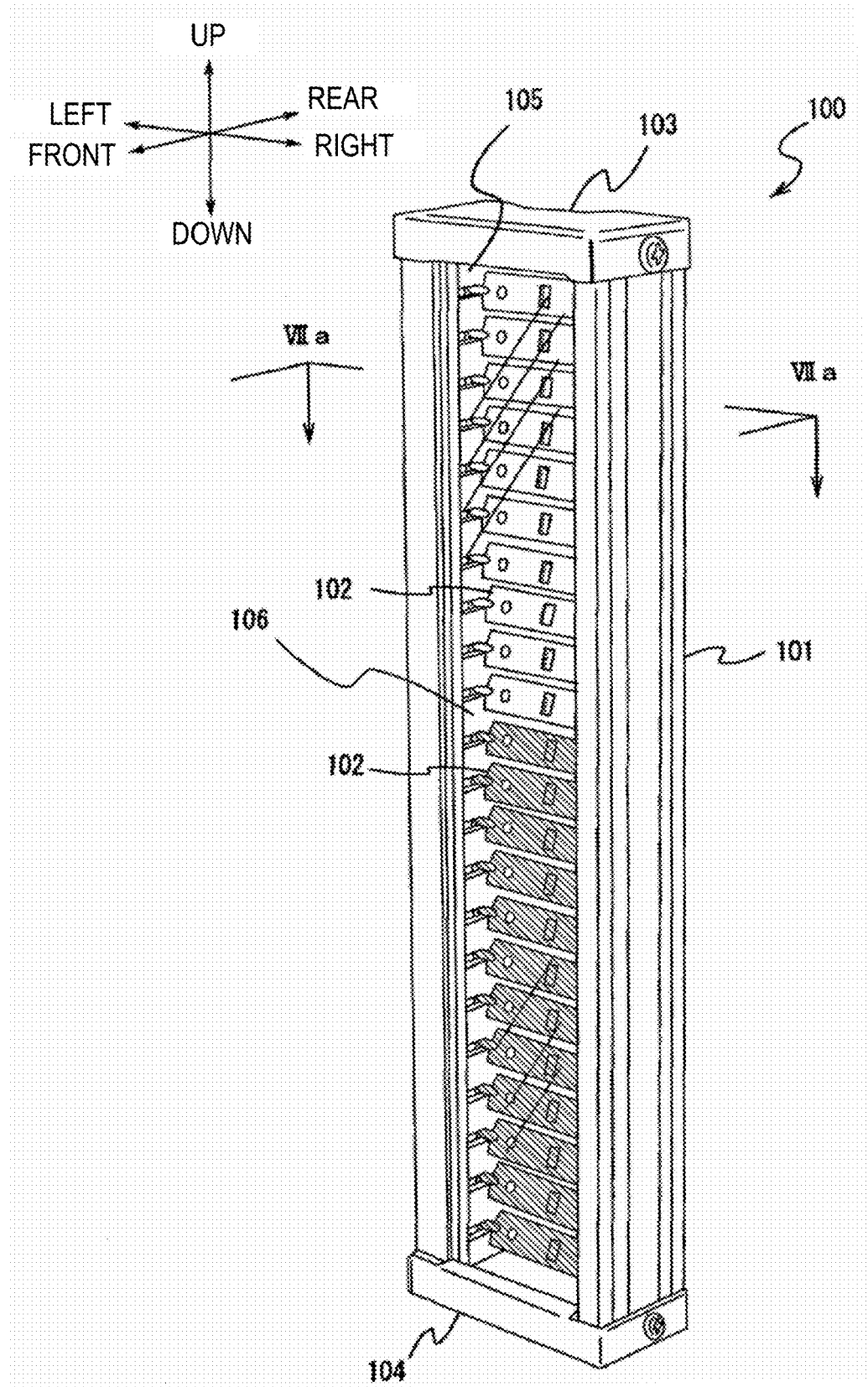
FIG. 6 is an appearance perspective view of an indicator used in the float liquid level meter according to one embodiment.

FIG. 6 is an appearance perspective view of an indicator used in the float liquid level meter according to one embodiment.

In the drawing, orientations are indicated for up-down, left-right, and front-rear.

Figure 7A:
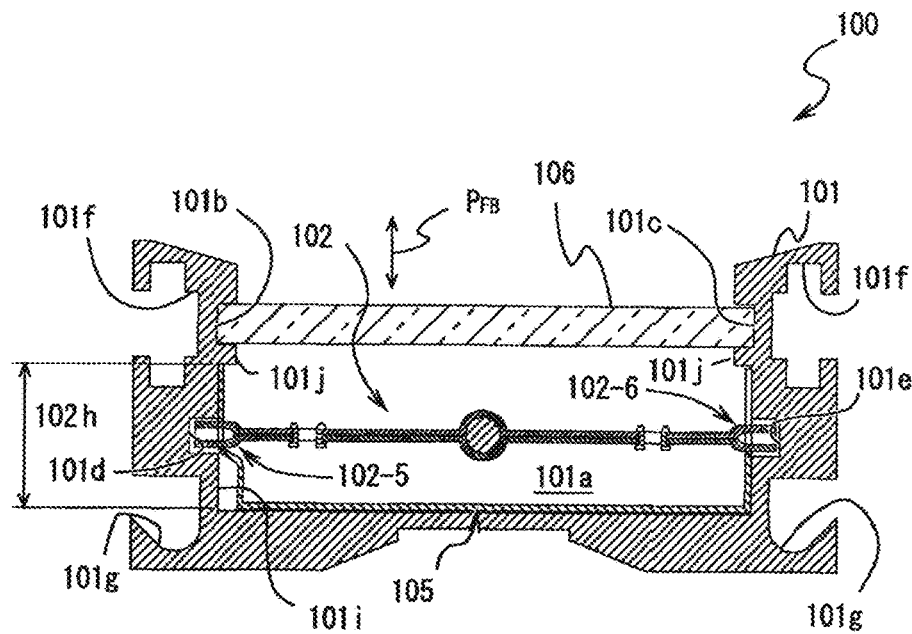
FIG. 7A is a sectional view taken on line VIIa-VIIa in FIG. 6.
Figure 7B:
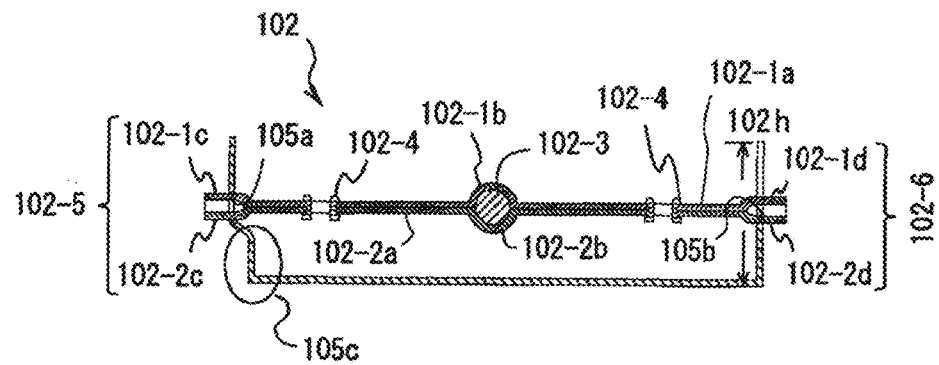
FIG. 7B is a view showing a rotatable slat 102 and a supporting metal fixture 105 shown in FIG. 7A.
Figure 7C:
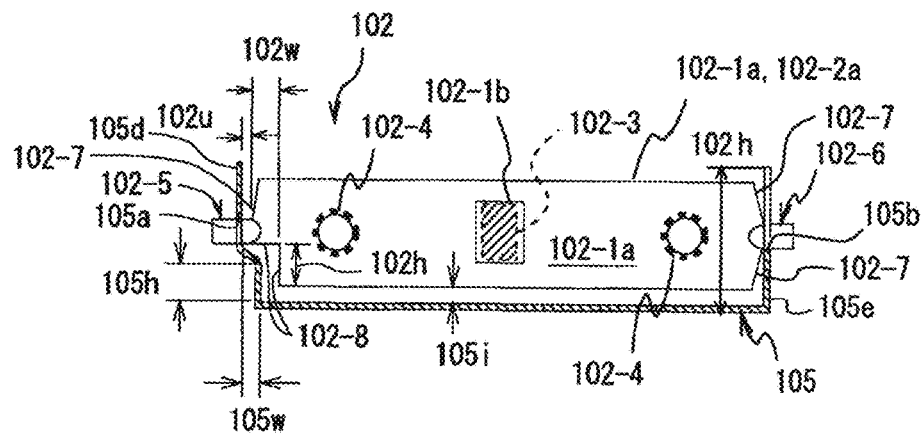
FIG. 7C is a view showing a state in which the rotatable slat 102 shown in FIG. 7B is pivoted by 90 degrees.
Figure 8:
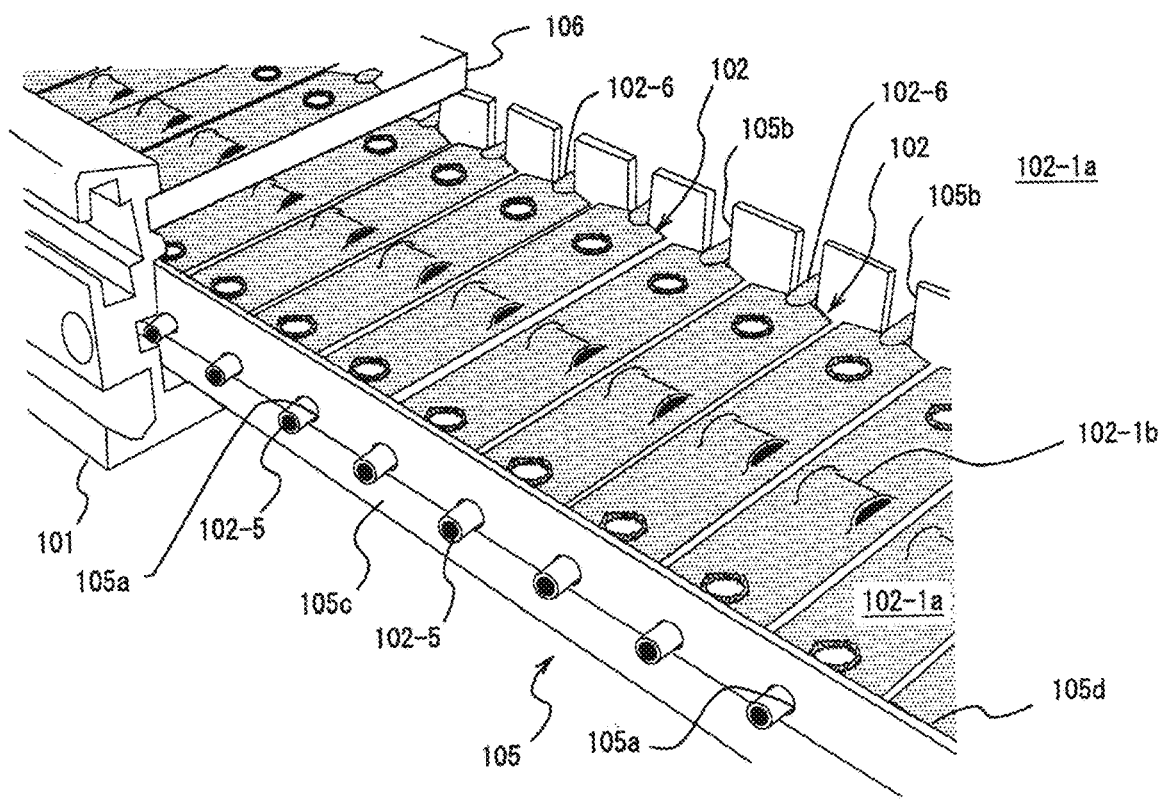
FIG. 8 is an explanatory drawing for describing an attachment of the rotatable slat used in the indicator shown in FIG. 6 to the supporting metal fixture.
Figure 9:
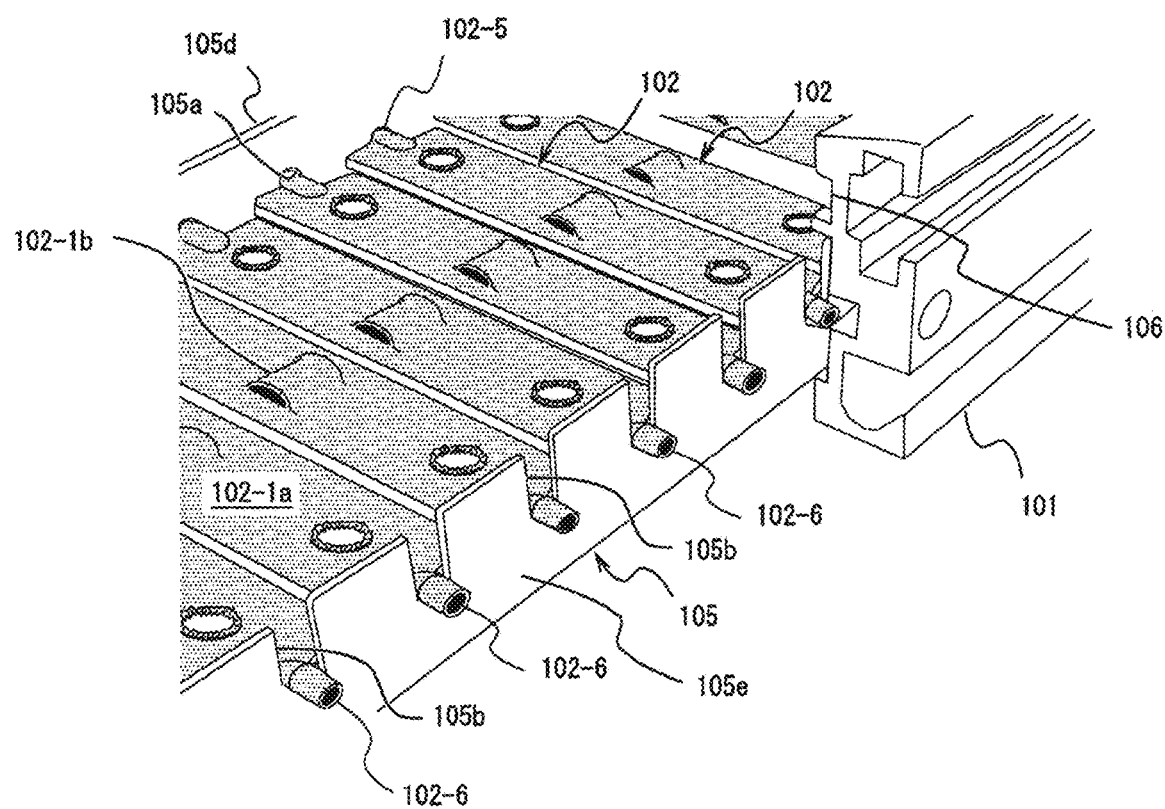
FIG. 9 is an explanatory drawing for describing an attachment of the rotatable slat used in the indicator shown in FIG. 6 to the supporting metal fixture.
Figure 10:
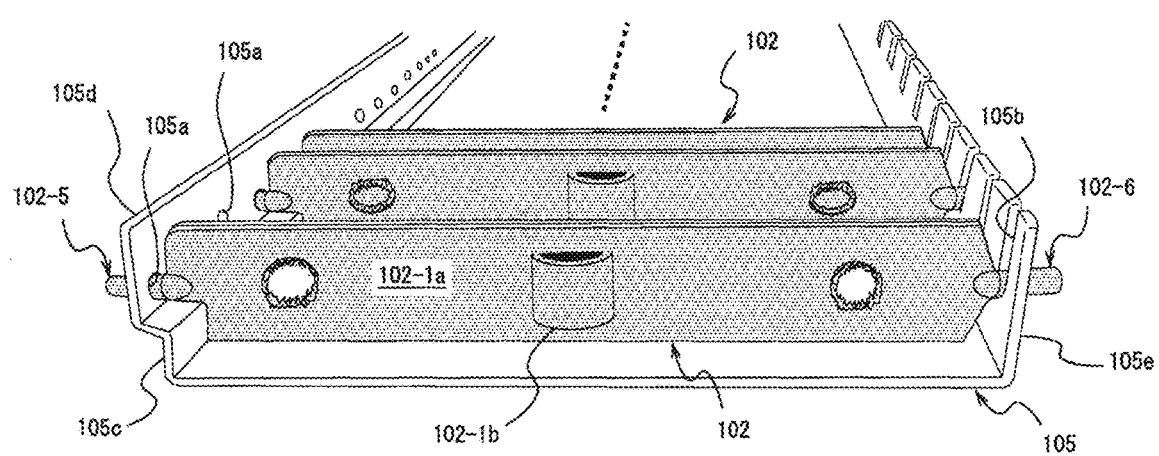
FIG. 10 is an explanatory drawing for describing an attachment of the rotatable slat used in the indicator shown in FIG. 6 to the supporting metal fixture.
Figure 11:
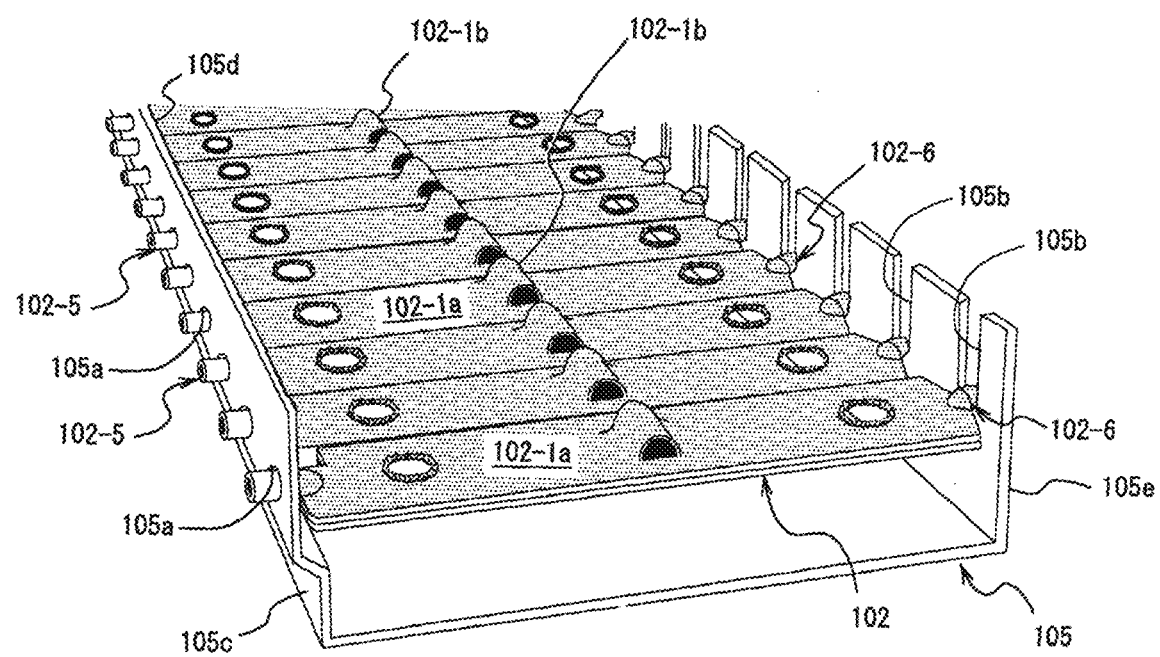
FIG. 11 is an explanatory drawing for describing an attachment of the rotatable slat used in the indicator shown in FIG. 6 to the supporting metal fixture.

FIG. 7A is a sectional view taken on line VIIa-VIIa in FIG. 6, FIG. 7B is a view showing the rotatable slat 102 and the supporting metal fixture 105 shown in FIG. 7A, and FIG. 7C is a view showing a state in which the rotatable slat 102 shown in FIG. 7B is pivoted by 90 degrees.

Figure 1:
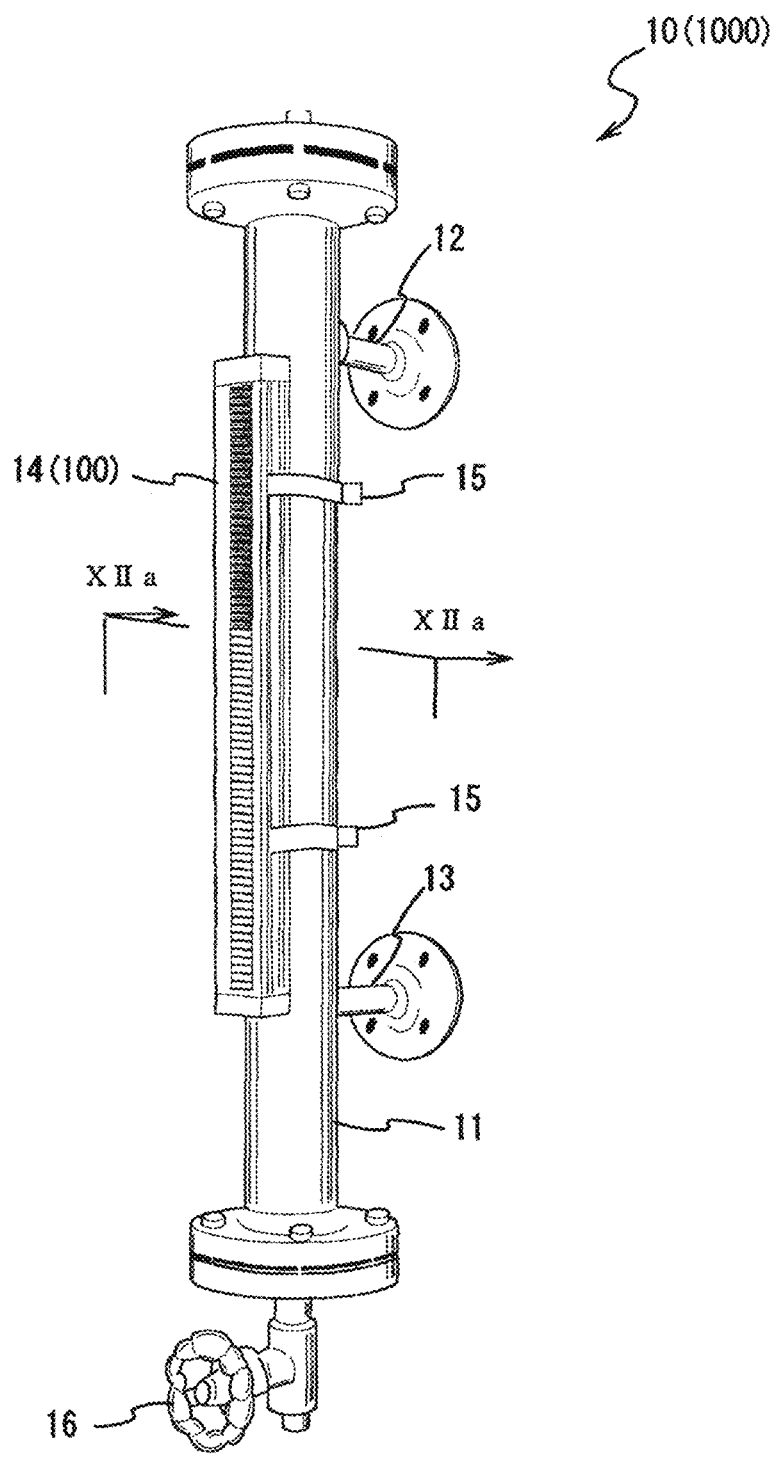
FIG. 1 is a schematic view of a float liquid level meter 10.
Figure 3:
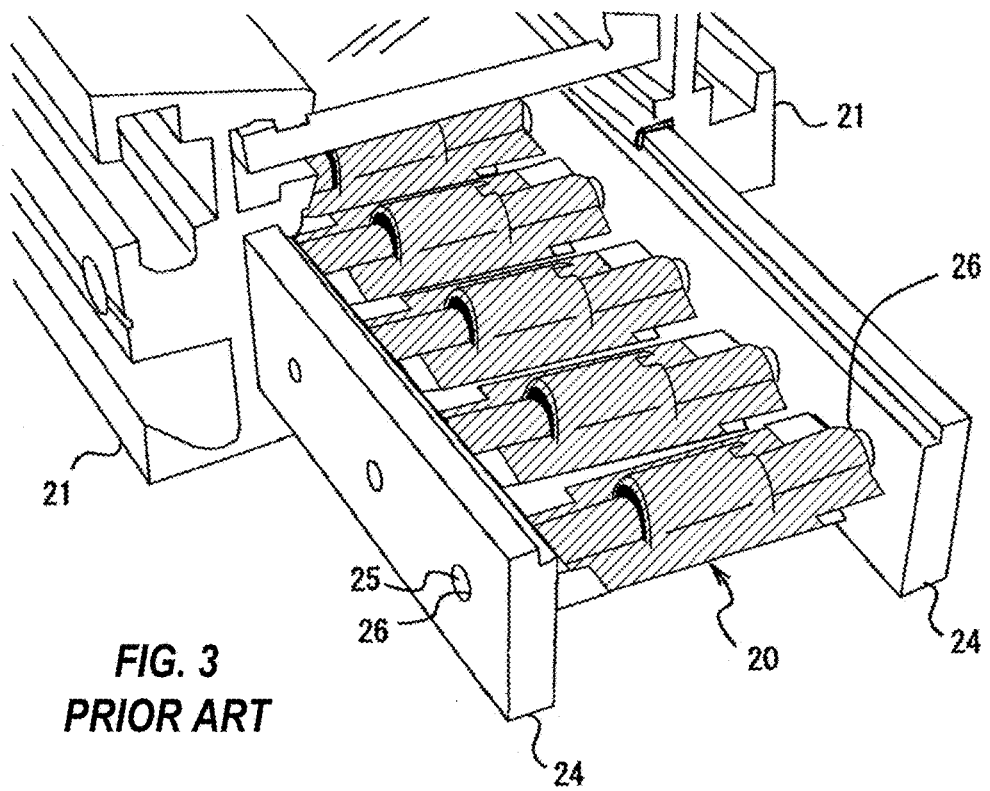
FIG. 3 is an appearance perspective view showing a state taking off the lid 22 (23) of the indicator 14 shown in FIG. 2A, which lid 22 (23) is made of non-magnetic material, and having the supporting metal fixtures 24, 24 pulled out from the housing 21 being made of non-magnetic material.
Figure 4:
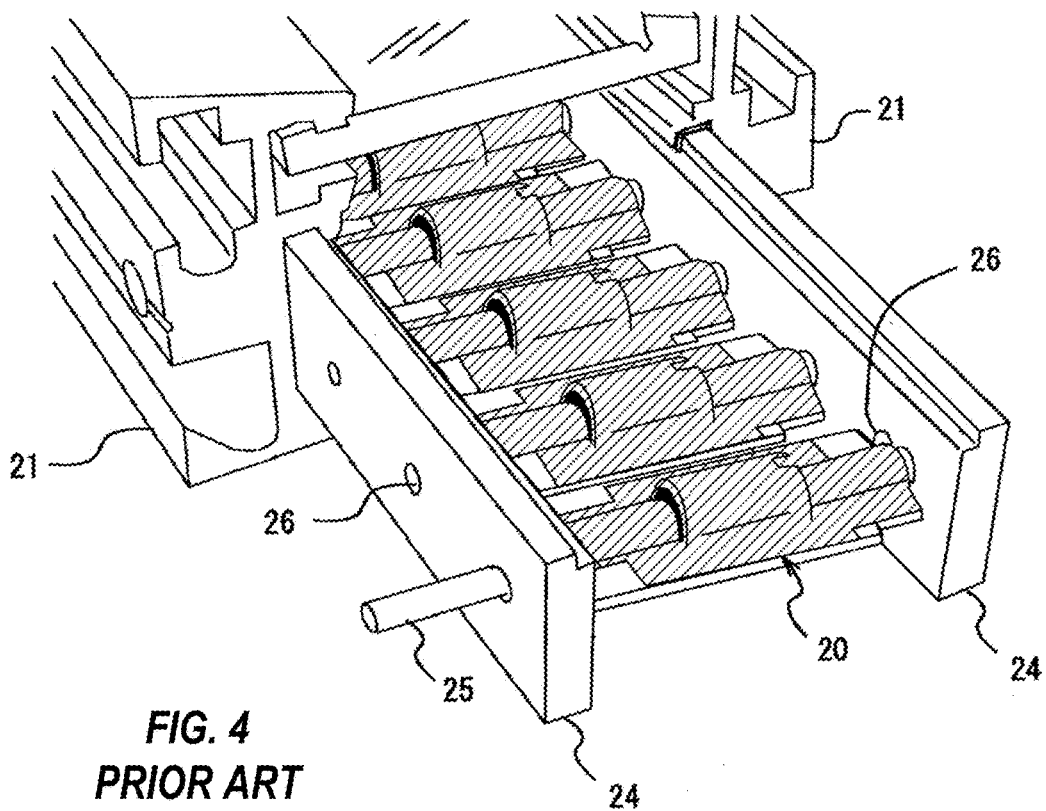
FIG. 4 is an appearance perspective view showing a state in which the rotation shaft 25 is pulled out from the supporting metal fixtures 24, 24 shown in FIG. 3.
Figure 5:
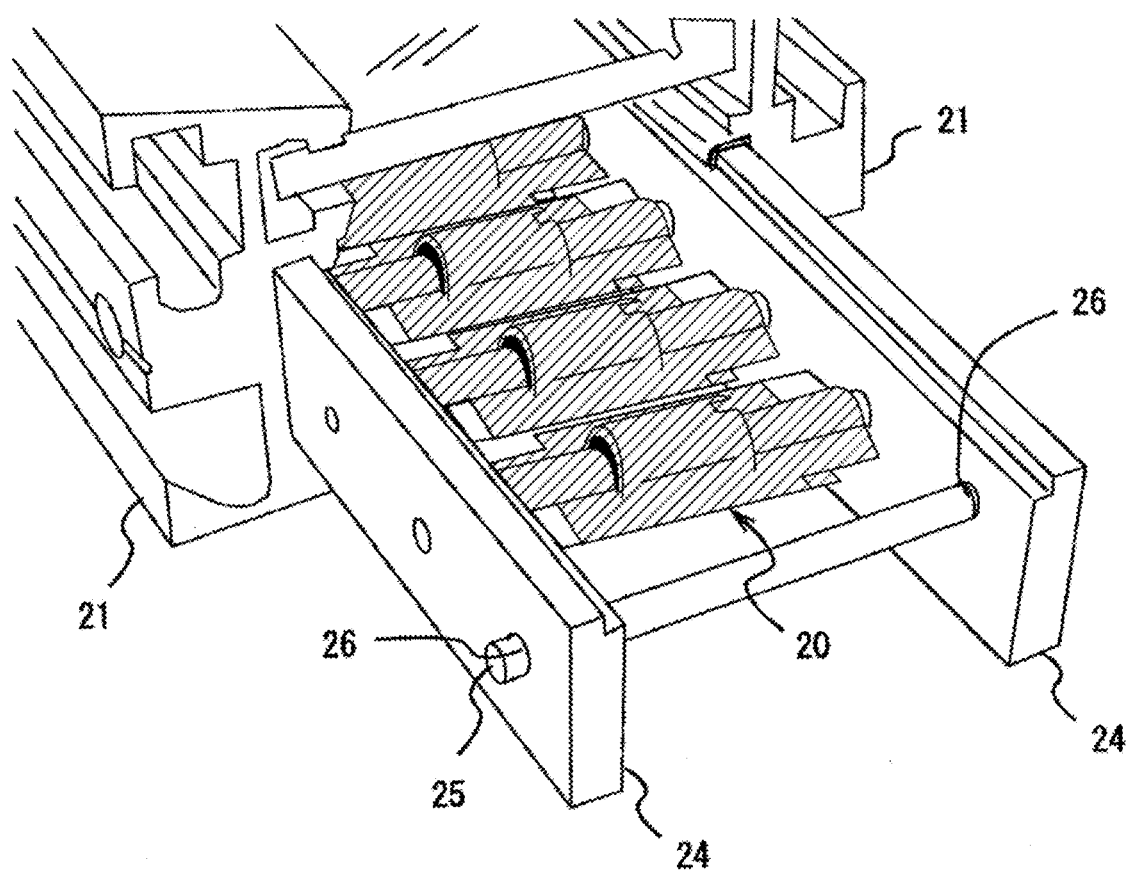
FIG. 5 is an appearance perspective view showing a state in which the rotation shaft 25 is inserted into the through holes 26, 26 of a pair of the supporting metal fixtures 24, 24 shown in FIG. 3.

The indicator 100 shown in FIG. 6 is fixed to a standing column as like the float liquid level meter 1000 shown in FIG. 1, and measures a liquid level of a liquid tank storing liquid.

The float liquid level meter indicator 100 has a plurality of pieces (22 pieces in the drawing, however not limited to this.) of the rotatable slats 102 disposed in a parallel manner, the supporting metal fixture 105 that supports the rotatable slats 102 in a rotatable manner, a housing 101 that holds the supporting metal fixture 105, an upper lid 103 and a lower lid 104 that prevent the supporting metal fixture 105 from falling off from the housing by covering either end of the housing 101, and a transparent member 106 attached to the housing 101 to cover the rotatable slats 102 in a visually observable manner.

In FIG. 6, 10 pieces of the rotatable slats 102 on an upper side and 12 pieces of the rotatable slats 102 on a lower side are shown to be in different colors; this shows a state in which a permanent magnet or a float behind the float liquid level indicator 100 is moved from upper to center, or from lower to center. Practically, when the float liquid level indicator 100 is attached to the standing column 11 as shown in FIG. 1, the rotatable slats 102 positioned on the liquid surface will be in a horizontal state caused by a magnetic field of the permanent magnet inside the float.

<Structure>

The housing 101 shown in FIG. 7A is, for example, a member made of non-magnetic material whose section is shaped in a substantially π-shape (in this case, the font for "π" is Gothic). The housing 101 is formed with a recess (groove) 101a for detachably holding the supporting metal fixture 105, and on an inner wall of the recess (groove) 101a, grooves 101d and 101e are formed, into which rotation shafts 102-5 and 102-6 protruding from the supporting metal fixture 105 are insertable. On an inner wall in the vicinity of an opening of the housing 101, the grooves 101b and 101c are formed for housing the transparent member 106 from outside in the longitudinal direction. For example, transparent glass or acrylic resin may be included as examples of the transparent member 106. One of grooves 101f and 101g on either side of the housing 101 is to be used for fixture to the standing column 11 with the fixing metal fixture 15, and the other is used, other than for fixing to the standing column 11, for fixing a dial plate indicating a liquid level standard or a signal emitting device that reacts against magnetism of the float.

In the drawing, 101i indicates a side groove portion of a fitting mechanism, and 101j indicates an upper end of the groove. 102h indicates a height of the supporting metal fixture 102. The height 102h of the supporting metal fixture is of the same height as a position of the upper end 101j of the groove of the side groove portion 101i of the recess 101a in the housing 101. Accordingly, there is no looseness in the front-rear direction (arrow $P_{FB}$ direction) in FIG. 7A.

The rotatable slat 102 shown in FIG. 7B has two substantially strip-shaped members 102-1a, 102-2a made of non-magnetic material, whose both sides are colored (for example, electrolytically colored, chemical conversion treatment) or painted (including coating), and an eyelets 102-4. A cylindrical permanent magnet 102-3 is built into the center of the rotatable slat 102, and a magnetizing direction of the permanent magnet 102-3 is in a perpendicular direction to the paper surface in FIG. 7B. Namely, the rotatable slat 102 has its magnetization direction be in a transverse direction of the strip. Although the shape of the permanent magnet 102-3 is cylindrical in the drawing, the present invention is not limited to this, and may be a prism, a cube, a disc, or a tubular shape.

On both ends of the rotatable slat 102, half-tubular rotation shafts 102-5 and 102-6 are formed integrally, for example by press-working. The rotation shaft 102-5 is formed by adhering substantially semi-cylindrical tubular portions 102-1c and 102-1d formed on either end of the substantially strip-shaped member 102-1a, and substantially semi-cylindrical tubular portions 102-2c and 102-2d formed on either end of the substantially strip-shaped member 102-2a, and fixing these with the eyelet 102-4. An edge in the longitudinal direction of the rotatable slat 102 is pivotable about the rotation shafts 102-5 and 102-6, and thus is called a wing.

In the embodiment, "edge" denotes a region expanding outside from a line connecting the rotation shaft 102-5 and the rotation shaft 102-6.

One end of the rotatable slat 102 shown in FIG. 7C has an oblique side that is line symmetrical to one of the rotation shaft 102-6, and the other end of the rotatable slat 102 (in this case, left end) has an oblique side 102-7 inclining with respect to the other rotation shaft 102-5 and a cutout 102-8. The size of the cutout 102-8 has a height 102h, a width 102w, and a play 102u. As for the cutout 102-8, when adhering the members 102-1a and 102-2a of the rotatable slat 102 together, shapes of its ends are line symmetrical to the rotation shaft 102-5, and are formed by cutting in for example a rectangular shape after bonding the members 102-1a and 102-2a with the eyelets 102-4. As such, the shape of the rotatable slat 102 can be made asymmetrical with respect to the rotation shaft.

Although the eyelets 102-4 have a circular shape in the drawing, the present invention is not limited to this, and may be an oval shape, a circular shape for an inner circumference and polygonal for an outer circumference, polygonal for inner circumference and outer circumference, or a disc shape having a plurality of through holes in its center.

The supporting metal fixture 105 is a member having a sectional shape of a substantially π-shape, made of non-magnetic material. The supporting metal fixture 105 has a plurality of through holes 105a formed in the longitudinal direction at regular intervals on one sidewall 105d, into which one of the rotation shafts 102-5 can be inserted, and has a plurality of cutouts 105b formed in a comb shape at a position on the other side wall 105e facing the through holes 105a, which cutouts can support the other rotation shaft 102-6.

In the present specification, a pair of the through hole 105a and the cutout 105b, a pair of the cutouts, a pair of an elongated hole and the cutout, or a pair of elongated holes are called rotation shaft supporting hole pairs.

Between the through hole 105a of the supporting metal fixture 105 and a bottom plane, a protrusion or valley folded portion 105c is formed for stopping the rotatable slat 102 when half-rotated. Namely, the supporting metal fixture 105 has asymmetrical sidewalls 105d and 105e with respect to the bottom plane of the supporting metal fixture 105. When representing a width of the valley folded portion 105c as 105w, representing a height of the valley folded portion 105c as 105h, and representing a minimum interval between the rotatable slat 102 and the supporting metal fixture 105 as 105i, it is necessary to satisfy the following inequalities (1) and (2):

$$105w < 102u + 102w \text{ (provided that, } 102w > 0) \tag{1}$$

$$105h < 105i + 102h \tag{2}$$

For example, when the rotatable slat 102 attempts to rotate from the state shown in FIG. 7C, although the cutout 102-8 of the rotatable slat 102 does not contact the valley folded portion 105c of the supporting metal fixture 105, the wing without the cutout 102-8 of the rotatable slat 102 will contact the valley folded portion 105c, and thus the rotatable slat 102 is hindered in its rotation. Namely, when the rotatable slat 102 is rotatably operated, by making the supporting metal fixture 105 contact only one side having the rotation shafts 102-5 and 1202-6 of the rotatable slat 102 serve as a boundary, the rotation range of the rotatable slat 102 is limited.

By the supporting metal fixture 105 having the valley folded portion 105c, the float liquid level meter 1000 will have no mistakes in display caused by too much rotation of the rotatable slats 102 even if the liquid level suddenly changes.

In the embodiment, examples of the non-magnetic material described above may include, for example, stainless steel whose nickel content is 4% or more (austenite-based stainless steel), aluminum, or titanium.

Moreover, ferrite magnet is an example of the permanent magnet 102-3, however the present invention is not limited to this, and KS steel, MK steel, samarium cobalt magnet, neodymium magnet, praseodymium magnet, or like magnets may also be used.

<Attachment of Rotatable Slat to Supporting Metal Fixture>

FIG. 8 to FIG. 11 are explanatory drawings for describing the attachment of the rotatable slat 102 used in the indicator 100 shown in FIG. 6, to the supporting metal fixture 105.

When attaching the rotatable slat 102 to the supporting metal fixture 105, the supporting metal fixture 105 is simply placed in a horizontal state, the rotation shaft 102-5 of the rotatable slat 102 is inserted through the through hole 105a of the supporting metal fixture 105, and the rotation shaft 102-6 of the rotatable slat 102 is inserted into the cutout 105b. As a result, the attachment of the rotatable slat 102 to the supporting metal fixture 105 is facilitated.

Even if the supporting metal fixture 105 somewhat inclines during movement together with the rotatable slat 102 after the rotatable slat 102 is attached to the supporting metal fixture 105, the rotatable slat 102 is integrated with the rotation shafts 102-5 and 102-6, and thus there is no fear of the rotation shafts 102-5 and 102-6 from falling down.

<Operation>

Figure 12A:
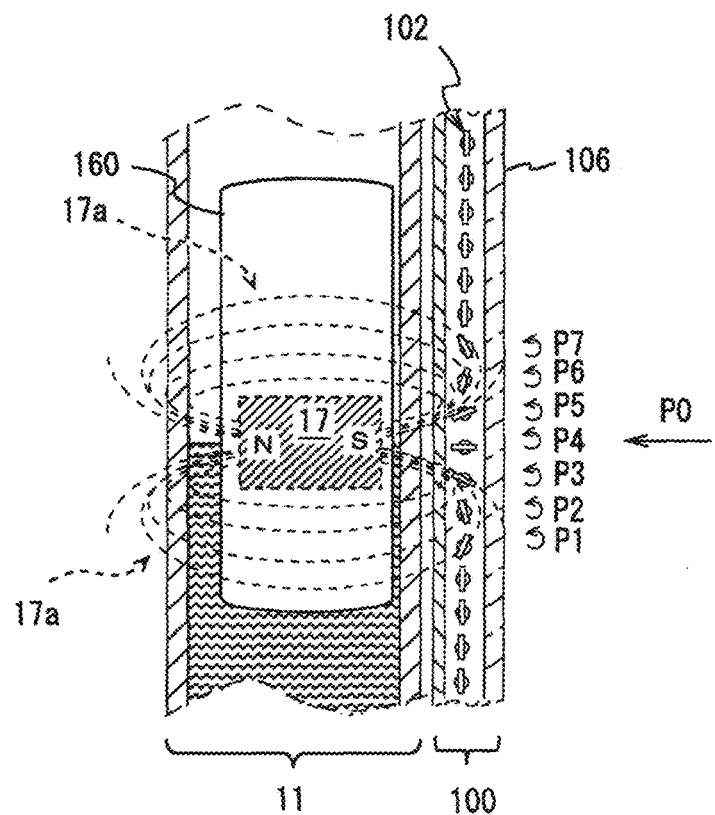
FIG. 12A is a sectional view taken on line XIIa-XIIa in FIG. 1.
Figure 12B:
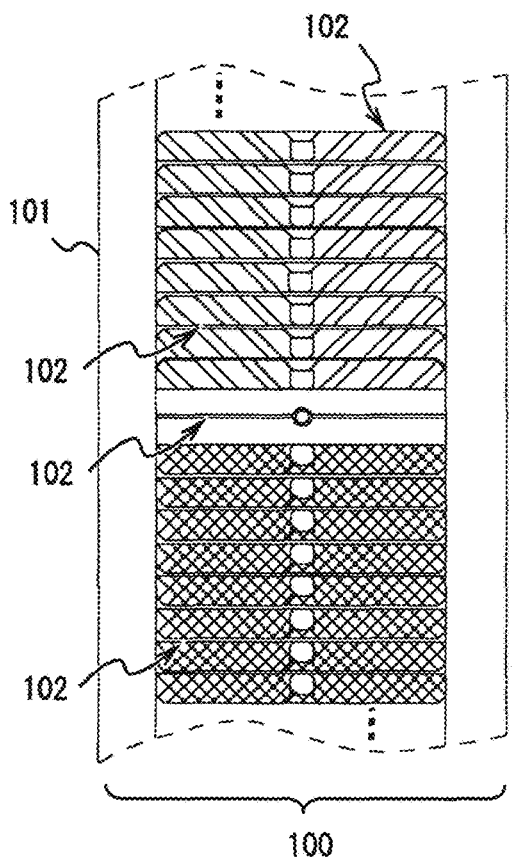
FIG. 12B is an arrow view of an arrow P0 direction in FIG. 12A.

FIG. 12A is a sectional view taken on line XIIa-XIIa in FIG. 1, and FIG. 12B is an arrow view of an arrow PO direction in FIG. 12A.

Since an influence of the magnetic field is small at a position of the float 160 of the standing column 11 away from the permanent magnet 17, the rotatable slats 102 display either one of their planes so that the wings are located on the same plane effected by the magnetic field of the in-built permanent magnet 102-3 (see FIGS. 7A-7C).

When the float 160 inside the standing column 11 moves in the up-down direction caused by an increase and decrease of liquid, due to the magnetic field of the permanent magnet 17 that is built inside the float 160, the rotatable slat 102 being influenced by the magnetic field of the permanent magnet 17 pivots. The wings of the rotatable slat 102 at a position in which the magnetic field of the permanent magnet 17 inside the float 160 becomes horizontal pivots to become from vertical to horizontal.

For example, when the float 160 inside the standing column 11 falls together with the fall of the liquid level, a magnetic field line 17a generated from the permanent magnet 17 of the float 160 descends while maintaining the same magnetic field.

In response to the change in direction of the magnetic field of the permanent magnet 17, the rotatable slat 102 pivots and changes. Namely, the rotatable slats 102 have their wings pivot in directions of the arrows P1, P2, P3, P4, P5, P6, P7. When the float 160 rises together with the rise in liquid level, the magnetic field of the permanent magnet 17 also ascends, and in response to this, the rotatable slat 102 pivots in a reverse direction to the arrows P1, P2, P3, P4, P5, P6, P7, the wings of the rotatable slat 102 facing the direction of the magnetic field becomes horizontal, and the other rotatable slats pivot at angles in response to the direction of the magnetic field. When the float 160 stops, the rotatable slats 102 have their wings stop at angles in response to the direction of the magnetic field at that time. Positions of the N-pole and S-pole in FIG. 12A may be the opposite way round. Moreover, polarity and shape of the permanent magnet 17 are not limited to those illustrated.

<Other Embodiments>

Figure 13:
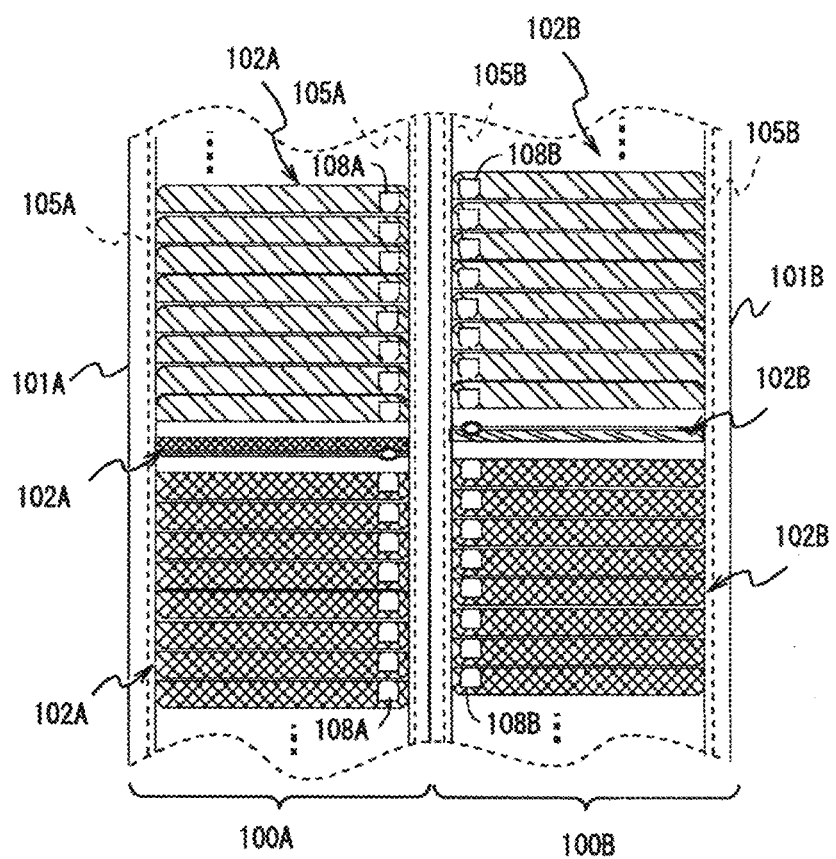
FIG. 13 is a schematic view showing another embodiment.

FIG. 13 is a schematic view showing another embodiment.

The difference between the embodiment shown in FIG. 13 and the embodiment shown in FIG. 6 is that a pair of supporting metal fixtures 105A and 105B having a plurality of rotatable slats 102A and 102B is disposed in a parallel manner, having rotation shafts thereof being centered between respective rotation shafts, and that permanent magnets 108A and 108B are provided on a supporting metal fixture side, disposed in parallel.

Namely, the supporting metal fixture 105A mounting the rotatable slats 102, having the permanent magnets 102-3 of the rotatable slats 102 of the supporting metal fixtures 105 mounting the rotatable slats 102 shown in FIG. 6 disposed on one of the ends (right side in the drawing), is bonded with the supporting metal fixture 105B mounting the rotatable slats 102, having the permanent magnets 102-3 of the rotatable slats 102 of the supporting metal fixture 105 mounting the rotatable slats 102 disposed on the other one of the ends (in this case, left side), in such a manner that the permanent magnets 108A and 108B are close to each other, are parallel, and that extension lines of the rotation shafts of the rotatable slats 102A and the rotation shafts of the rotatable slats 102B are at equal intervals.

The standing column 11 will be positioned at the bonded portion of the supporting metal fixture 105A that mounts the rotatable slats 102, with the supporting metal fixture 105B that mounts the rotatable slats 102.

In FIG. 13, the rotatable slats 102A are facing slightly downwards and the rotatable slats 102B are facing slightly upwards; this is because the magnetic field lines from the permanent magnets 17 are each slightly inclined with respect to the liquid surface caused by the center of the permanent magnets 17 within the float 160 being positioned between the rotatable slats 102A and 102B. In this case, the scale between the rotatable slats 102A and 102B is to be read.

By configuring as such, the measurement accuracy becomes two times more as compared to the embodiment shown in FIG. 6.

<Effect>

From the above, according to the present embodiment:

(1) Since simply one of the rotation shafts of rotatable slats integrated with the rotation shafts is inserted into the through hole of the supporting metal fixture and the other rotation shaft is inserted into the cutout of the supporting metal fixture, the attachment of the rotatable slats to the supporting metal fixture is facilitated.

(2) Since a valley folded portion is formed between a bottom plane of the supporting metal fixture and the sidewall, the rotatable slat will not rotate and stop at the valley folded portion even when the liquid surface suddenly changes. Hence, display of the rotatable slats will not vary or become distorted, and thus measurement becomes possible.

(3) By providing a float liquid level meter indicator having the rotatable slats configured to have the permanent magnets closer to a bonded portion side in such a manner that intervals between the rotation shafts of both the rotatable slats become regular, the measurement accuracy improves.

<Others>

The present embodiment described above shows one preferred example of embodiments of the present invention. The present invention is not limited to this however, and various modifications are possible thereto within the scope of the present invention. For example, in the aforementioned description, an example is described in which a pair of the supporting metal fixtures 105A and 105B are bonded in parallel, however the present invention is not limited to this, and a plurality of the supporting metal fixtures 105A and 105B can be disposed in series. In this case, the measuring range broadens. Moreover, although the aforementioned embodiment describes a case in which there is one cutout in the rotatable slat, the present invention is not limited to this, and two or more cutouts can be formed in the rotatable slats, or no cutout may be provided. Moreover, although the aforementioned embodiment describes a case in which a plurality of through holes 105a are formed at regular intervals in the longitudinal direction on one of the sidewalls 105d of the supporting metal fixture 105, which through holes 105a can have one of the rotation shafts 102-5 inserted therein, a plurality of cutouts 105b that can support the rotation shafts 102-6 may be formed in comb-shapes on both sidewalls 105d and 105e. Moreover, the aforementioned embodiment describes a case in which the cutout 105b is formed to the supporting metal fixture 105, however the present invention is not limited to this, and an elongated hole may be formed instead of the cutout 105b. Moreover, the aforementioned embodiment describes a case in which the rotatable slats 102 adhere two pieces of plate-shaped members, however the present invention is not limited to this, and may be configured of one piece or three or more pieces of plate-shaped members. Moreover, the aforementioned embodiment describes a case in which a section of the housing 101 is symmetrical, however the present invention is not limited to this, and this may be asymmetrical.

REFERENCE SIGNS 10, 1000 Float liquid level meter
11 Standing column
12, 13 Connecting pipe
14, 100 Indicator
15 Fixing metal fixture
16 Valve handle
17, 102-3 Permanent magnet
17a Magnetic field line
101 Housing
101a Recess (Groove)
101b, 101c, 101d, 101e, 101f, 101g Groove
101i Side groove
101j Groove upper end
102 Rotatable slat
102-1a, 102-2a Substantially strip-shaped member
102-1c, 102-1d, 102-2c, 102-2d Substantially semi-tubular portion
102-4 Eyelet
102-5, 102-6 Rotation shaft
102-7 Oblique side
102-8, 105b Cutout
102u Play
102w, 105w Width
103 Upper lid
104 Lower lid
105, 105A, 105B Supporting metal fixture
105a Through hole
105c Valley folded portion
105d, 105e Sidewall
105i Interval
106 Transparent member
160 Float

What is claimed is:

1. A float liquid level meter indicator, comprising:
a plurality of rotatable slats, each having a permanent magnet and rotation shafts to be rotatable in response to a float magnet position inside a float liquid level meter;
a supporting metal fixture not obstructing rotation of the plurality of the rotatable slats, the supporting metal fixture having an opening enabling visual observation of a state of the rotatable slats and a plurality of rotation shaft supporting hole pairs adapted to support the rotation shafts provided on left and right of the rotatable slats at equal intervals in an up-down direction, at least one side of the rotation shaft supporting hole pairs being of a cutout shape or an elongated hole shape in a front-rear direction;
a housing adapted to attach to the float liquid level meter, having a groove into which the rotation shafts protruding from the supporting metal fixture are insertable and which prevents the rotatable slats inserted in the up-down direction from falling off in a front-rear direction, and having an opening to enable visual observation of the state of the rotatable slats; and
a lid adapted to avoid the supporting metal fixture from falling out from the housing.

2. The float liquid level meter indicator according to claim 1, wherein a plurality of the supporting metal fixtures are used, the plurality of the supporting metal fixtures being configured to be disposed vertically in series or in parallel, or in series and in parallel.

3. The float liquid level meter indicator according to claim 1, wherein the rotatable slats are shaped asymmetrical with respect to the rotation shafts thereof, only one side of the rotatable slats is shaped contactable with part of the supporting metal fixture in rotational operation thereof, and a rotating range of the rotatable slats is limited by providing the rotation shaft supporting hole adapted to allow for a shape of the supporting metal fixture to contact only one side with respect to the rotation shaft of the rotatable slat at a certain angle of the rotatable slat.

4. The float liquid level meter indicator according to claim 3, wherein a plurality of the supporting metal fixtures are used, the plurality of the supporting metal fixtures being configured to be disposed vertically in series or in parallel, or in series and in parallel.

* * * * *